United States Patent [19]

Stevenson et al.

[11] 4,391,642
[45] Jul. 5, 1983

[54] ALKALI METAL SILICATE BINDER COMPOSITIONS

[75] Inventors: John Stevenson, Sutton Coldfield; Alan Cross, Rubery; John G. Anderson, Birmingham, all of England

[73] Assignee: Foseco International Limited, Birmingham, England

[21] Appl. No.: 199,927

[22] PCT Filed: Feb. 4, 1980

[86] PCT No.: PCT/GB80/00019
§ 371 Date: Oct. 27, 1980
§ 102(e) Date: Aug. 13, 1980

[87] PCT Pub. No.: WO80/01768
PCT Pub. Date: Sep. 4, 1980

[30] Foreign Application Priority Data

Feb. 27, 1979 [GB] United Kingdom ............... 7906875

[51] Int. Cl.³ ......................... B28B 7/36; C08L 1/00
[52] U.S. Cl. .......................... 106/38.23; 106/38.25; 106/74; 106/80; 106/214; 106/38.5 R; 106/162; 524/791; 524/842
[58] Field of Search ............. 106/80, 38.23, 38.35, 106/214, 74, 38.27, 38.5, 162

[56] References Cited

U.S. PATENT DOCUMENTS

| | | | |
|---|---|---|---|
| 1,048,536 | 12/1912 | Horn | 106/80 |
| 1,171,905 | 2/1916 | Tompkins | 106/74 |
| 1,498,270 | 6/1924 | Harris | 106/80 |
| 3,615,780 | 10/1971 | Kim et al. | 106/80 |
| 3,816,145 | 6/1974 | Melcher | 106/38.35 |
| 4,070,196 | 1/1978 | Kraak et al. | 106/38.35 |
| 4,131,477 | 12/1978 | Kagan et al. | 106/38.35 |
| 4,194,918 | 3/1980 | George et al. | 106/80 |

FOREIGN PATENT DOCUMENTS

| | | |
|---|---|---|
| 1302716 | 10/1970 | Fed. Rep. of Germany . |
| 2323466 | 4/1977 | France . |
| 2370537 | 6/1978 | France . |
| 1451652 | 10/1976 | United Kingdom . |

*Primary Examiner*—Theodore Morris
*Attorney, Agent, or Firm*—Cushman, Darby & Cushman

[57] ABSTRACT

A binder composition in aqueous solution, suitable for use in the production of foundry sand moulds and cores is obtained by mixing (i) an alkali silicate
(ii) a substantially water soluble carbohydrate selected from monosaccharides, disaccharides, polysaccharides and derivatives thereof and
(iii) a phenolic compound selected from monohydric phenols, dihydric phenols, trihydric phenols, phenols of polynuclear hydrocarbons and phenolic acids, which is miscible with or soluble in an aqueous solution of an alkali metal silicate.

The composition may also contain an oxyanion such as a borate which is capable of forming a water soluble complex with the carbohydrate.

A mixture of phenolic compounds, such as a mixture consisting predominantly of isomers of di- and trihydroxy diphenyl obtained in the distillation of crude resorcinol, may be used.

The preferred carbohydrate is a stabilized starch hydrolysate whose reducing power has been removed by a process such as hydrogenation.

15 Claims, No Drawings

ALKALI METAL SILICATE BINDER COMPOSITIONS

This invention relates to alkali metal silicate binder compositions, particularly for use in the production of foundry moulds and cores.

It is common practice to use alkali metal silicate aqueous solutions, particularly sodium silicate solutions as binders for sand for the production of foundry moulds and cores. These solutions usually contain 40–50% by weight of a sodium silicate having a $SiO_2:Na_2O$ ratio of from 2.0:1 to 3.0:1. In one process the sodium silicate solution is mixed with sand, and the resultant mixture is formed into a mould or core. Carbon dioxide gas is then blown through the mould or core, and due to chemical reaction between the sodium silicate and the carbon dioxide a bonded mould or core results. In another process a so-called hardener, which may be for example, a mixture of diacetin and triacetin, is mixed with sodium silicate and sand, and the mixture is formed into a mould or core which on standing hardens due to chemical reaction between hardener and the sodium silicate.

A disadvantage of both processes is that after casting the moulds and cores are difficult to break down and remove from the solidified cast metal. This can be particularly disadvantageous in the case of cores of complex shape, or when the moulds and cores are used for the production of castings in metals which are cast at high temperatures, e.g. steel castings. Accordingly numerous proposals have been made in the past to add materials, so-called breakdown agents, to the mixture of sand and sodium silicate, which will aid the breakdown or disintegration ability of the sand mould or core after casting.

Among the breakdown agents used is a variety of carbohydrate-containing materials such as cellulose derivatives, starches, and sugars, e.g. sucrose and dextrose.

It has now been found that improved results can be obtained in the production of foundry sand moulds and cores bonded with an alkali metal silicate binder by using a binder composition which contains in addition in the alkali metal silicate and a carbohydrate, a phenolic compound which is miscible with or soluble in an aqueous alkali metal silicate solution.

According to the invention there is provided a binder composition in aqueous solution obtained by mixing:

(i) an alkali metal silicate (ii) a substantially water soluble carbohydrate selected from monosaccharides, disaccharides, polysaccharides and derivatives of any of these and (iii) a phenolic compound selected from monohydric phenols, dihydric phenols, trihydric phenols, phenols of polynuclear hydrocarbons and phenolic acids, which is miscible with or soluble in an aqueous solution of an alkali metal silicate.

According to a further feature of the invention there is provided a method of making an article of bonded particulate material such as a foundry mould or core, which comprises forming to the desired shape a mixture comprising particulate material and a binder composition in aqueous solution obtained by mixing:

(i) an alkali metal silicate (ii) a substantially water soluble carbohydrate selected from monosaccharides, disaccharides, polysaccharides and derivatives of any of these and (iii) a phenolic compound selected from monhydric phenols dihydric phenols, trihydric phenols, phenols of polynuclear hydrocarbons and phenolic acids, which is miscible with or soluble in an aqueous solution of an alkali metal silicate.

The preferred alkali metal silicate is sodium silicate. The $SiO_2:Na_2O$ ratio of the sodium silicate may vary widely, e.g. from 2.0:1 to 3.5:1 but sodium silicates having a ratio of from 2.0:1 to about 2.5:1 are preferred.

Examples of suitable monosaccharides include glucose, mannose and fructose, and examples of suitable disaccharides include sucrose, maltose and lactose.

Polysaccharides, also known as glycans, are polymers of monosaccharides with or without reducing terminal groups.

The monosaccharide constituent may be an aldose or a ketose. Examples of glycans are glucans (polymers of glucose), xylans (polymers of xylose) and gluco-xylans (copolymers of glucose and xylose).

In general high molecular weight glycans, such as starch, amylose and amylopectin, are unsuitable for use in binder compositions according to the invention since they are not soluble in water. Suitable glycans are available as components of starch hydrolysates or glucose syrups.

Suitable low molecular weight polysaccharides or glycans may be produced by acid, enzymic or other procedures which cause rupture of the glycosidic linkage in the parent higher molecular weight glycan. Such materials of this type are available as components of starch hydrolysates or glucose syrups.

Suitable polysaccharide derivatives include glycanitols. Glycanitols are products obtained by the reduction of glycans. The monosaccharide constituent of the glycan may be an aldose or a ketose. During production of a glycanitol the stereo-chemical configuration of the substituted aldose or ketose end group may be retained or there may be conversion in the derived polyhydric alcohol derivative. For example, the reduction of a substituted reducing end group, such as a substituted glucose end group in a starch dextrin, may occur with retention of configuration to yield a substituted glucitol (such as sorbitol) derivative or with some conversion to a substituted mannitol derivative where the configuration of carbon two is altered. Suitable glycanitols are available as components of hydrogenated starch hydrolysates.

Other suitable derivatives may be produced by the reduction of low molecular weight polysaccharides which have been produced by procedures which cause rupture of the glycosidic linkages in higher molecular weight polysaccharides. Such materials are also available as components of hydrogenated starch hydrolysates.

Examples of suitable disaccharide derivatives include maltitol which is produced by the reduction of maltose and lactitol which is produced by the reduction of lactose.

Examples of suitable monosaccharide derivatives include hexitols which are produced by the reduction of their corresponding hexoses, for example sorbitol which is produced by the reduction of glucose or gulose and mannitol which is produced by the reduction of mannose, and pentitols which are produced by the reduction of their corresponding pentoses, for example xylitol which is produced by the reduction of xylose.

Commercially available carbohydrate-containing materials which may contain one or more carbohydrates may be used. Example of such materials include molasses from sucrose refining, whey from milk processing, invert sugar or partially inverted sugar which is a mixture of sucrose, fructose and glucose, and the glucose syrups referred to above.

Derivatives of carbohydrates in which the structure is modified other than at the reducing terminal group by processes such as etherification, esterification or oxidation may also be used. Examples of such derivatives are oxidised starch syrups, esters of starch and carboxyalkyl ethers of starch.

The preferred carbohydrates are "stabilised" carbohydrates whose reducing power has been removed in order to render the carbohydrates essentially stable in alkali media.

Stabilised carbohydrates may be produced by hydrogenation or by other processes which remove reducing power such as etherification, esterification or oxidation or by reaction with urea or urea derivatives.

Examples of stabilised carbohydrates are glycanitols, disaccharide derivatives such as maltitol or lactitol, hexitols and pentitols.

The preferred stabilised carbohydrates are the stabilised starch hydrolysates described in British Patent specification 1,546,079. These stabilised starch hydrolysates may be prepared from starch hydrolysates having a dextrose equivalent of between 5 and 100, preferably between 5 and 75, and more preferably between 10 and 40. Dextrose equivalent is defined as the reducing power i.e. the reducing sugar content of a starch hydrolysate expressed as D-glucose on a dry basis. The starch hydrolysate may be stabilised by selective oxidation, by reaction with urea or urea derivatives, or by hydrogenation. The preferred method is by catalytic hydrogenation with hydrogen and the resulting hydrogenated starch hydrolysate consists of a mixture of glycanitols, reduced low molecular weight polysaccharides, reduced monosaccharides and reduced disaccharides.

The binder composition may contain a mixture of two or more carbohydrates.

When the phenolic compound is a phenol of a polynuclear hydrocarbon, the hydrocarbon may be one in which the rings are isolated or one in which the rings are fused together.

The following are examples of suitable phenolic compounds:

Catechol (o-dihyroxybenzene);
Resorcinol (m-dihydroxybenzene);
Quinol (p-dihydroxybenzene);
Pyrogallol (vic-trihydroxybenzene);
Alkyl derivatives of mono-, di- or trihydric phenols;
Hydroxy benzene dimers or oligomers containing two or more benzene rings and one or more hydroxyl groups such as monohydroxy diphenyls, dihydroxy diphenyls or trihydroxy diphenyls;
Salicylic acid (o-hydroxybenzoic acid);
Gallic acid (3:4:5:-trihydroxybenzoic acid).

Mixtures of phenolic compounds may be used and a variety of such mixtures are commercially available as by-products from chemical processes.

Examples of commercially available mixtures are a mixture consisting predominantly of isomers of di- and trihydroxy diphenyls produced as a still residue when crude resorcinol is distilled, and a mixture of resorcinol, resorcinol homologues, catechol and catechol homologues produced as a by-product from the carbonisation of coal.

The binder composition may also contain an oxyanion salt capable of forming a water soluble complex with the carbohydrate as described in German Patent Application specification 2750294. Examples of suitable oxyanions are oxyanions of boron, tin, germanium, tellurium and arsenic.

The oxyanion may be added to the composition in the form of an oxyanion salt or an oxyanion salt may be formed in situ as a result of interaction between an acid containing the oxyanion or an oxide, and added alkali or alkali contained in the alkali metal silicate.

Examples of suitable oxyanion salts include alkali metal oxyanion salts such as sodium metaborate, sodium tetraborate, sodium pentaborate, sodium germanate, sodium stannate, sodium tellurite and sodium arsenite. Of the oxyanion salts of tin, tellurium and arsenic, stannates, tellurites and arsenites respectively are preferred. The most preferred oxyanion salts are alkali metal borates since they are readily and economically available.

Examples of oxyanion salts formed in situ are an alkali metal borate formed by interaction between boric oxide and an alkali for example the alkali in the alkali metal silicate, and an alkali metal germanate formed by reaction between germanium dioxide and an alkali. More than one oxyanion salt may be added to the composition.

The binder composition may also contain one or more of urea, furfuryl alcohol or formaldehyde.

The binder composition may be added to the particulate material as separate additions of aqueous alkali metal silicate, aqueous carbohydrate solution and phenolic compound or any two or all three of the components may be premixed. Premixing of the phenolic compound with the aqueous alkali metal silicate and separate addition of the third component, or premixing of all three components are preferred. However, the method adopted for adding the binder composition is to some extent dependent on the particular carbohydrate material and used since some carbohydrate materials e.g. carbohydrates containing reducing sugars react with alkali metal silicates and cannot therefore be premixed with the alkali metal silicate and stored and also on the particular phenolic compound used. When the carbohydrate and the alkali metal silicate cannot be premixed for storage it may be convenient to dissolve part of the phenolic compound in the alkali metal silicate and part in an aqueous solution of the carbohydrate.

When the binder composition also contains an oxyanion salt the oxyanion salt may be added to the particulate material separately from each of the other three components or the oxyanion salt may be premixed with one or more of the other components.

The binder composition will usually contain 15–47% by weight of alkali metal silicate, 2–45% by weight of carbohydrate, 0.1–10% by weight of phenolic compound and balance water.

The actual amount of phenolic compound present will depend on the particular compound chosen and on the composition of the alkali metal silicate and carbohydrate with which it is to be used.

The preferred binder composition contains 26–45% by weight of alkali metal silicate, 3–27% by weight of carbohydrate, 0.5–1.5% phenolic compound and balance water.

When an oxyanion salt is present the oxyanion salt will usually constitute up to 5% by weight of the binder composition. The preferred oxyanion salt content is from about 0.5 to about 2.0% by weight of the binder composition.

The actual composition for a particular combination of alkali metal silicate, carbohydrate and phenolic compound and, when present, oxyanion salt, will depend on a number of factors such as the nature of carbohydrate, the degree of mutual solubility of the components, and alkali metal oxide to silica ratio of the alkali metal silicate and the nature of the oxyanion.

The binder composition of the invention may be used to bind a variety of particulate materials but is particularly useful for bonding particulate refractory materials such as silica, olivine, chromite and zircon sands in the manufacture of foundry moulds or cores. After production the mould or core may be hardened by injection of carbon dioxide gas or alternatively a chemical hardening agent for the alkali metal silicate, e.g. a mixture of acetate esters of glycerol, may be added to the sand binder composition mixture before the mould or cores are formed.

The improved binder compositions of the invention offer a number of advantages when used in the production of foundry moulds or cores due to the presence of the phenolic compound.

When moulds and cores are hardened by gassing with carbon dioxide the gassing time may be reduced compared with the time required when using known alkali metal silicate-carbohydrate binders which do not contain a phenolic compound, thus resulting in a saving of carbon dioxide. In this respect compositions which also contain an oxyanion salt such as a borate are particularly advantageous, and further improvements can also be obtained when the composition also contains furfuryl alcohol, urea or formaldehyde. The binder compositions of the invention also give improvements in mould and core storage properties in both dry and humid conditions. Less binder, and hence less sodium silicate, need be used compared with that needed when using known carbohydrate-containing silicate binders. A reduction in the amount of sodium silicate used not only produces an economic advantage in that it results in a saving of sodium silicate but also gives better breakdown properties of the sand and improved surface finish of metal castings produced using the sand. Furthermore due to a lowering of the amount of residual soda in the sand after casting, the sand is more readily reclaimable for re-use.

The following examples will serve to illustrate the invention.

EXAMPLE 1

A series of binder compositions was prepared as follows:

(1) 6.15 Parts by weight of anhydrous sodium tetraboarate were dissolved in 100 parts by weight of a hydrogenated starch hydrolysate syrup derived from maize starch and having a dextrose equivalent of about 30 before hydrogenation and less than 0.2 after hydrogenation and a starch hydrolysate content of 71% by weight. 20 Parts by weight of the resultant solution were mixed with 80 parts by weight of an aqueous solution of sodium silicate having a $SiO_2:Na_2O$ ratio of 2.2:1 and a sodium silicate content of about 44% by weight (2) 1 Part by weight of quinol was dissolved in 100 parts by weight of binder (1).

(3) 1 Part by weight of catechol was dissolved in 100 parts by weight of binder (1).

(4) 1 Part by weight of resorcinol was dissolved in 100 parts by weight of binder (1).

(5) 1 Part by weight of orcinol was dissolved in 100 parts by weight of binder (1).

(6) 1 Part by weight of pyrogallol was dissolved in 100 parts by weight of binder (1).

(7) 1 Part by weight of a by-product of the carbonisation of coal containing primarily a mixture of resorcinol, catechol and their homologues was dissolved in 100 parts by weight of binder (1).

3.5 Parts by weight of each of binder compositions (1)-(7) were separately mixed with 100 parts by weight of silica and (A.F.S. Fineness No. 47) and the resultant sand-binder mixtures were used to prepare standard A.F.S. 50 mm×50 mm cylindrical cores. Cores were gassed for various times with carbon dioxide gas at 19°-21° C., 0.35 kg/cm² line pressure and 5.5 l/m flow-rate.

The compression strengths of the cores were measured immediately (i.e. within 10 seconds) after gassing. The following results were obtained.

| Gassing Time (sec) | COMPRESSION STRENGTH (kg/cm²) | | | | | |
|---|---|---|---|---|---|---|
| | 5 | 10 | 20 | 30 | 60 | 120 |
| (1) | <2.0 | 3.1 | 6.0 | 8.4 | 10.2 | 12.4 |
| (2) | 2.9 | 5.8 | 8.9 | 12.3 | 14.7 | 15.3 |
| (3) | 2.2 | 4.7 | 9.2 | 10.4 | 12.4 | 11.8 |
| (4) | 2.0 | 4.4 | 6.7 | 10.7 | 12.9 | 14.0 |
| (5) | 2.9 | 5.5 | 8.2 | 9.3 | 13.1 | 14.2 |
| (6) | 3.1 | 4.3 | 8.8 | 12.0 | 13.1 | 11.6 |
| (7) | 2.4 | 4.8 | 8.2 | 10.5 | 13.2 | 15.5 |

It is apparent from the results that binder systems (2)-(7) all develop strength on gassing at a significantly faster rate than binder (1).

To achieve a compression strength of 6.8 kg/cm² (i.e. 100 p.s.i.) requires gassing times for binders (1)-(7) respectively of 24, 12, 14, 18, 15, 13 and 16 seconds respectively. Hence binder (2)-(7) offer a saving of between 25% and 50% in gas consumption compared to binder (1).

EXAMPLE 2

The following binder composition was prepared.

(8) 1 Part by weight of mixed isomers of di- and trihydroxy diphenyls (a still residue from the distillation of crude resorcinol) was dissolved in 100 parts by weight of binder (1).

Binders (1) and (8) were used to prepare test cores according to the procedure described in Example 1. The compression strengths of the cores produced were measured:

(a) on specimens immediately (i.e. within 10 seconds) after gassing (b) on specimens stored for 24 hours in a relatively dry laboratory atmosphere (c) on specimens stored for 24 hours in a humid atmosphere at 95% relative humidity.

The following data were obtained

| GASSING TIME (Secs) | | COMPRESSION STRENGTH (kg/cm²) | | | | | |
|---|---|---|---|---|---|---|---|
| | | 5 | 10 | 20 | 30 | 60 | 120 |
| (1) | As-gassed | <2.0 | 3.2 | 6.7 | 8.6 | 11.4 | 11.7 |
| | Dry storage | 36.9 | 29.8 | 24.2 | 18.1 | 11.9 | 7.8 |
| | Humid storage | 13.9 | 13.6 | 11.2 | 11.3 | 8.9 | 6.5 |
| (8) | As-gassed | 3.1 | 4.8 | 7.6 | 10.2 | 12.2 | 14.1 |
| | Dry storage | 40.8 | 32.0 | 25.2 | 23.3 | 13.9 | 11.7 |

-continued

| GASSING TIME (Secs) | COMPRESSION STRENGTH (kg/cm²) | | | | | |
|---|---|---|---|---|---|---|
| | 5 | 10 | 20 | 30 | 60 | 120 |
| Humid storage | 14.1 | 14.1 | 13.1 | 11.2 | 9.9 | 6.3 |

It is apparent from these results that binder (8) develops strength on gassing at a faster rate than binder (1). Thus binder (1) requires a gassing time of about 23 seconds to achieve a compression strength of 6.8 kg/cm² (i.e. 100 p.s.i.), and results in subsequent strengths of 21.8 kg/cm² and 11.2 kg/cm² after 24 hours dry and humid storage respectively. Binder (8) requires only 15 seconds to achieve the same as-gassed compression strength, yet results in subsequent dry and humid storage strengths of 32.7 kg/cm² and 13.9 kg/cm² respectively.

EXAMPLE 3

The following binder compositions were prepared:
(9) 10 Parts by weight of sucrose were dissolved in 90 parts by weight of a solution of sodium silicate having a $SiO_2:Na_2O$ ratio of 2.2:1 and a sodium silicate content of about 44% by weight.
(10) 1 Part by weight of pyrogallol was dissolved in 100 parts by weight of binder (9).
Binders (9) and (10) were compared according to the precedure described in Example 1. The following results were obtained.

| GASSING TIME (Secs) | COMPRESSION STRENGTH (kg/cm²) | | | | | |
|---|---|---|---|---|---|---|
| | 5 | 10 | 20 | 30 | 60 | 120 |
| (9) | <2.0 | <2.0 | 4.1 | 6.5 | 10.4 | 11.8 |
| (10) | <2.0 | 3.1 | 5.3 | 8.0 | 12.1 | 14.1 |

It can be seen that binder composition (10) develops strength at a faster rate than binder (9) and also gives a higher maximum strength. Thus binder (9) requires 32 seconds gassing to achieve a compression strength of 6.8 kg/cm² (i.e. 100 p.s.i.), whereas binder (10) requires a gassing time of only 26 seconds.

EXAMPLE 4

The following binder composition was prepared:
(11) 1 Part by weight of urea was dissolved in 100 parts by weight of binder (8).
Binder compositions (1), (8) and (11) were compared according to the procedure described in Example 1, and the following results were obtained.

| GASSING TIME (Secs) | COMPRESSION STRENGTH (kg/cm²) | | | | | |
|---|---|---|---|---|---|---|
| | 5 | 10 | 20 | 30 | 60 | 120 |
| (1) | <2.0 | 3.7 | 6.1 | 8.3 | 11.8 | 12.2 |
| (8) | 2.0 | 4.7 | 9.0 | 10.8 | 13.1 | 13.6 |
| (11) | 2.7 | 5.7 | 9.5 | 11.0 | 13.7 | 15.0 |

The data show that the improvement obtained in gassing speed with binder (8) over binder (1) is maintained by binder (11) and that a progressive increase in maximum strength is obtained between binder (1) and binder (8), and binder (8) and binder (11).

EXAMPLE 5

The following binder composition was prepared.
(12) 1 Part by weight of furfuryl alcohol was dissolved in 100 parts by weight of binder (7).

Binders (1), (7) and (12) were compared as described in Example 1 and the following data obtained.

| GASSING TIME (Secs) | COMPRESSION STRENGTH (kg/cm²) | | | | | |
|---|---|---|---|---|---|---|
| | 5 | 10 | 20 | 30 | 60 | 120 |
| (1) | <2.0 | 3.9 | 6.9 | 8.8 | 11.6 | 14.1 |
| (7) | 2.4 | 4.8 | 8.2 | 10.5 | 13.2 | 15.5 |
| (12) | 4.1 | 6.1 | 9.9 | 12.0 | 13.3 | 14.9 |

It is apparent from the results that the improvement in rate of strength development offered by binder (7) over binder (1) may be further enhanced by the addition of furfuryl alcohol to the binder as in binder (12).
Thus to achieve a compression strength of 6.8 kg/cm² (i.e. 100 p.s.i.) requires a gassing time of about 20 seconds for binder (1), 16 seconds for binder (7) and only 12 seconds for binder (12), hence offering considerable savings in $CO_2$ consumption.

EXAMPLE 6

The following compositions were prepared:
(13) 6.15 Parts by weight of anhydrous sodium tetraborate were dissolved in 100 parts by weight of the hydrogenated starch hydrolysate syrup used to prepare binder (1).
(14) 5 Parts by weight of mixed isomers of di- and trihydroxy diphenyls were dissolved in 100 parts by weight of composition (13)
(15) 5 Parts by weight of formalin were dissolved in 100 parts by weight of composition (14).
Sand-binder mixtures were prepared by separately mixing 0.7 parts by weight of each of compositions (13)–(15) and 2.8 parts by weight of the sodium silicate used to prepare binder (1) with 100 parts by weight of silica sand of A.F.S. Fineness No. 47.
The mixtures were used to prepare and test cores as described in Example 1. The following results were obtained.

| GASSING TIME (Secs) | COMPRESSION STRENGTH (kg/cm²) | | | | | |
|---|---|---|---|---|---|---|
| | 5 | 10 | 20 | 30 | 60 | 120 |
| (13) | <2.0 | 2.4 | 4.9 | 7.8 | 11.6 | 13.7 |
| (14) | <2.0 | 3.5 | 6.1 | 9.2 | 12.4 | 14.7 |
| (15) | 2.0 | 4.3 | 6.9 | 10.9 | 13.7 | 15.8 |

The data demonstrate that gassing speed may be successively enhanced by addition of the phenolic compounds and then formalin to composition (13).
Thus composition (13) requires a gassing time of 27 seconds to achieve a strength of 6.8 kg/cm² (i.e. 100 p.s.i) whereas composition (14) requires 22 seconds and composition (15) requires only 20 seconds.

EXAMPLE 7

The following compositions were compared:
(16) A starch hydrolysate solution having a dextrose equivalent of about 28 and a starch hydrolysate content of about 63% by weight.
(17) 3.5 Parts by weight of pyrogallol were dissolved in composition (16).
(18) 3.5 parts by weight of mixed isomers of di- and trihydroxy diphenyls were dissolved in composition (16).
Compositions (16)–(18) were compared according to the procedure described in Example 1 as 1 part by weight additions, together with 2.5 parts by weight additions of the sodium silicate used to prepare binder (1), to 100 parts by weight of silica sand.

The following results were obtained:

| GASSING TIME (Secs) | COMPRESSION STRENGTH (kg/cm²) | | | | | |
|---|---|---|---|---|---|---|
| | 5 | 10 | 20 | 30 | 60 | 120 |
| (16) | <2.0 | 2.7 | 4.9 | 6.2 | 8.2 | 10.1 |
| (17) | <2.0 | 3.8 | 6.1 | 7.5 | 10.2 | 12.4 |
| (18) | 2.0 | 4.3 | 5.9 | 7.9 | 9.3 | 10.5 |

It is readily apparent from the results that the incorporation of the phenolic compounds into compositions (17) and (18) significantly enhances the rate of strength development on gassing.

We claim:

1. A binder composition in aqueous solution obtained by mixing 15–47% by weight of an alkali metal silicate and 2–45% by weight of a substantially water soluble carbohydrate selected from nonosaccharides, disaccharides, polysaccharides and derivatives thereof and characterised in that it also contains 0.1–10% by weight of a phenolic compound selected from the group consisting of catechol, resorcinol, quinol, pyrogallol, an alkyl derivative of a di- or trihydric phenol, a hydroxy benzene dimer or oligomer containing two or more benzene rings and one or more hydroxyl groups, salicylic acid, gallic acid and mixtures thereof.

2. A binder composition according to claim 1 characterised in that the hydroxy benzene dimer is a monohydroxy diphenyl, a dihydroxy diphenyl or a trihydroxy diphenyl.

3. A binder composition according to claim 1 characterised in that the hydroxy benzene dimer is a mixture of di- and trihydroxy diphenyls produced as a still residue in the distillation of crude resorcinol.

4. A binder composition according to claim 1 characterised in that phenolic compound is a mixture of resorcinol, resorcinol homologues, catechol and catechol homologures produced in the carbonisation of coal.

5. A binder composition according to claim 1 characterised in that it contains 26–45% by weight of alkali metal silicate, 3–27% by weight of carbohydrate, 0.5–1.5% phenolic compound and balance water.

6. A binder composition according to any of claims 1 to 5 characterised in that it also contains an oxyanion salt.

7. A binder composition according to claim 6 characterised in that the oxyanion salt is an alkali metal borate.

8. A binder composition according to any of claims 1 to 5 characterised in that it also contains furfuryl alcohol.

9. A binder composition according to any of claims 1 to 5 characterised in that it also contains formaldehyde.

10. A binder composition according to any of claims 1 to 5 characterised in that it also contains urea.

11. A binder composition according to any of claims 1 to 5 characterised in that the alkali metal silicate is sodium silicate.

12. A binder composition according to any of claims 1 to 5 characterised in that the carbohydrate is a monosaccharide selected from glucose and fructose or a disaccharide selected from sucrose, maltose and lactose.

13. A binder composition according to any of claims 1 to 5 characterised in that the carbohydrate is a starch hydrolysate.

14. A binder composition according to any of claims 1 to 5 characterised in that the carbohydrate is a hydrogenated starch hydrolysate.

15. A method of making an article of bonded particulate material which comprises forming to the desired shape a mixture comprising particulate material and a binder, and causing or allowing the mixture to harden, characterised in that the binder used is a composition according to any one of claims 1 to 5.

* * * * *